A. O. CRAVEN.
AIR FILTER.
APPLICATION FILED NOV. 20, 1918.
1,316,144.
Patented Sept. 16, 1919.
2 SHEETS—SHEET 1.
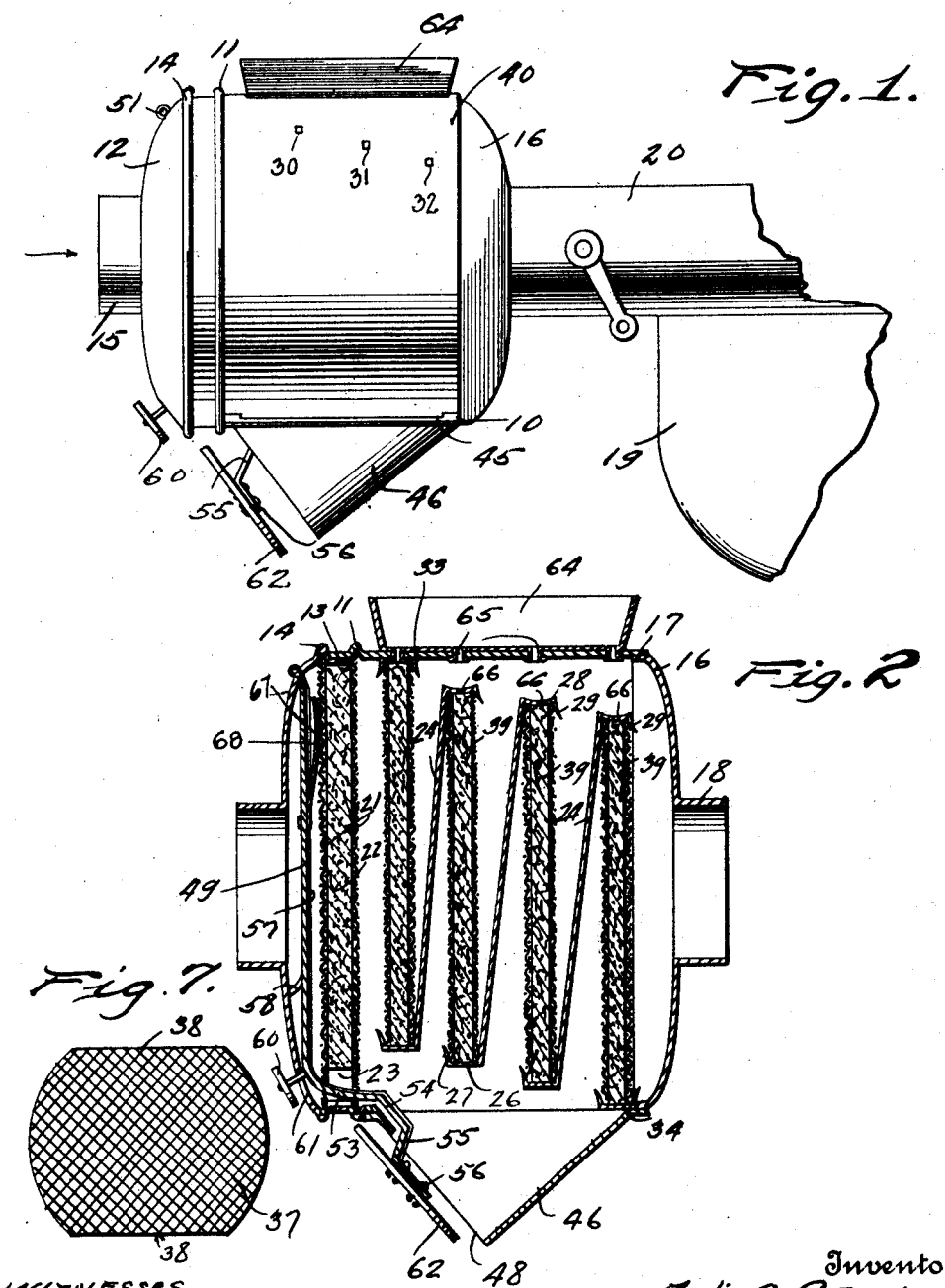
Inventor
Austin O. Craven
Witnesses
By
Attorney

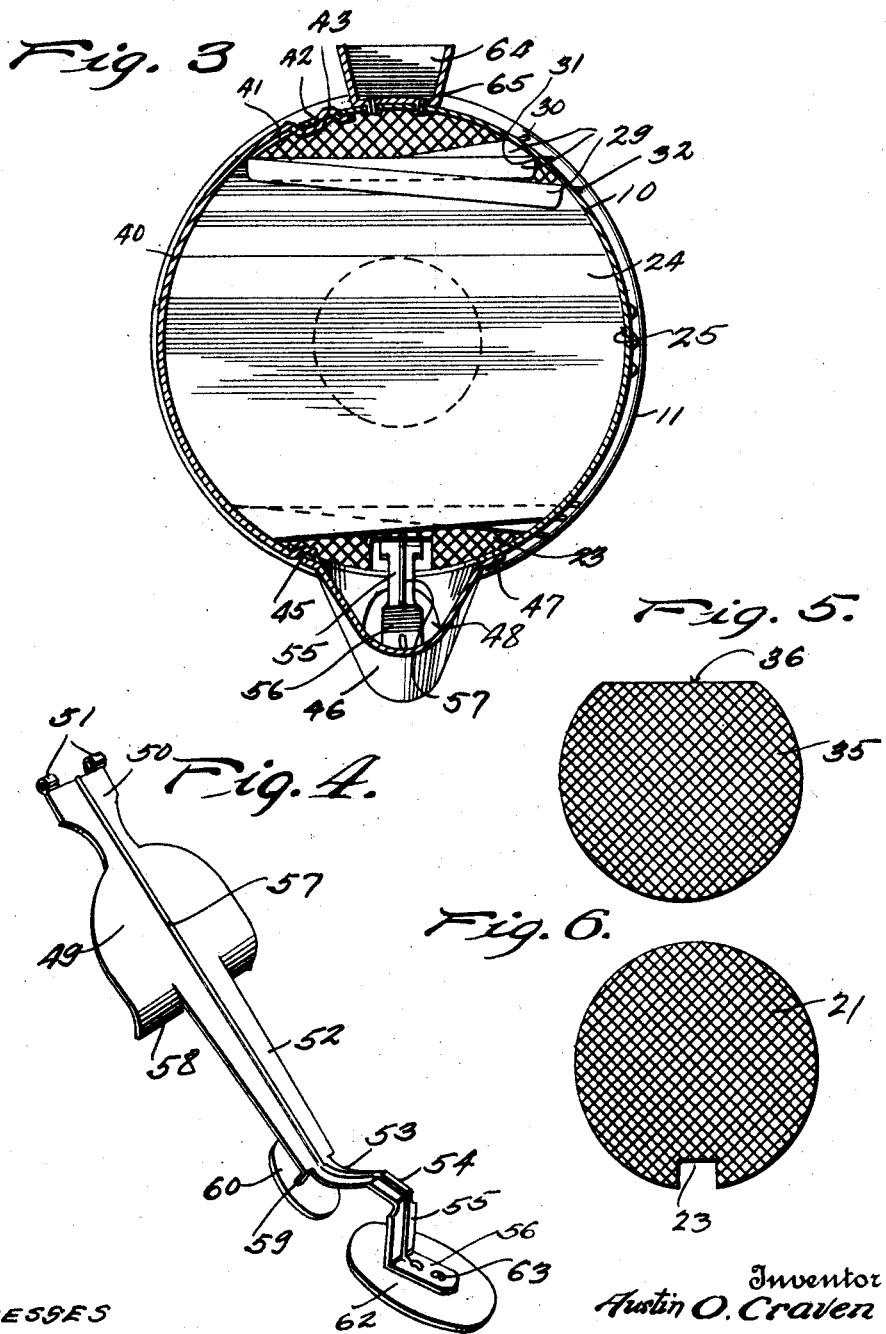

UNITED STATES PATENT OFFICE.

AUSTIN O. CRAVEN, OF DETROIT, MICHIGAN.

AIR-FILTER.

1,316,144.  Specification of Letters Patent.  Patented Sept. 16, 1919.

Application filed November 20, 1918. Serial No. 263,353.

*To all whom it may concern:*

Be it known that I, AUSTIN O. CRAVEN, a citizen of the United States, residing at Detroit, in the county of Wayne and State of Michigan, have invented certain new and useful Improvements in Air-Filters, of which the following is a specification.

This invention is an air filter and relates in general to improvements and attachments connected to the carbureters of internal combustion engines of motor vehicles and the like.

One object of this invention is the production of a filter which is so constructed as to prevent the passing of grit or dust into the carbureter when the engine is in operation.

Another object of this invention is the production of a filter which is provided with an automatic damper so arranged as to cause the air sucked through the filter to pass through the filter members carried within the casing, although after the suction has ceased the automatic damper will move to permit of the falling of dust from the lower portion of the casing.

Another object of this invention is the production of a filter wherein baffle supporting plates are provided for supporting the independent filter members in correct positions and for also tending to direct air currents in a diagonal manner through the independent filters for causing the refuse carried by said air currents to be caught and prevented from passing into the carbureter.

Another object of this invention is the production of efficient means for the directing of gasolene on to the independent filter members for priming the engine when necessary to start the same, owing to the fact that the air sucked through the filter will convey the gasolene fumes in the form of a gas for the purpose specified.

One practical form of construction and assembly of the present invention will be hereinafter described and is illustrated in the drawings, in which—

Figure 1 is a side elevation of the complete filter, showing the manner in which the same is connected to a carbureter which is shown in fragmentary elevation.

Fig. 2 is a central longitudinal vertical section through the complete filter.

Fig. 3 is a transverse vertical section through the filter.

Fig. 4 is a detail perspective view of the automatic damper frame.

Fig. 5 is an elevation of the filter member at one end of the casing, contiguous to the outlet thereof.

Fig. 6 is an elevation of the filter member adjacent the opposite end of the casing at the inlet thereof, and Fig. 7 is an elevation of one of the intermediate filter members.

In the preferred embodiment of the present invention about to be described, 10 indicates the body of the casing which is preferably cylindrical as indicated in Fig. 3, although of course, it may be of any other desired shape without departing from the spirit of the invention. This cylindrical casing body 10 is provided with an annular bead 11, for purposes to be herein set forth. The intake cap 12 has a collar 13 thereon which extends into one end of the body 10 and thus supports the intake cap 12. This cap 12 is also provided with an annular bead 14 for purposes to be hereinafter set forth, which is substantially parallel to the bead 11 of the body 10. The hollow neck 15 extends from the central portions of the cap 12 and thus allows air to easily pass into the interior of the casing.

The outlet cap 16 has a collar 17 thereon, extending into the opposite end of the body 10, for forming a closure therefor. This outlet cap 16 is provided with a neck 18 at its central portion, as shown in Fig. 2.

The carbureter 19 illustrated in fragmentary elevation in Fig. 1 has an air pipe 20 leading therefrom and this air pipe 20 receives the neck 18, thus causing the filter to be carried upon the end of the air pipe connected to the carbureter 19.

Circular wire mesh disk 21 as illustrated in Fig. 6 is inserted in each of the beads 11 and 14, as shown in Fig. 2 thus causing these disks 21 to be spaced apart. The filtering material 22 is inserted between these disks and thus a filter member is directly in front of the intake neck 15. It should be noted that the disks 21 and the filtering material 22 are notched as indicated at 23 for purposes to be hereinafter set forth.

The baffle supporting plates 24 are similarly constructed and it will be noted by referring to Fig. 2 that these plates all slant, although they are substantially parallel. The ends of the plates 24 are curved as indicated at 25 in Fig. 3 to fit evenly upon the inner surface of the circular body 10 of the filter. Each plate 24 is provided with a horizontal ledge 26 extending longitudinally thereof and a flange 27 is formed upon the outer edge of the ledge 26. The upper portion of the plate is provided with a longitudinally channeled trough 28 having a retaining flange 29 extending downwardly therefrom. The ends of the plate 24 as well as the ends of the ledges 26 and trough 28 have studs, 30, 31 and 32 extending therefrom and projecting through the circular body 10 to be carried by the circular body, as illustrated in Figs. 1 and 3. Thus it will be seen that the plates are firmly supported. An inverted U-shaped trough 33 is fixed to the upper portion of the body 10, while the U-shaped channeled member 24 is secured to the lower portion of the body 10, as shown in Fig. 2. The trough 33 is in alinement with the ledge at one end of the third baffle plate, while the channeled member 34 is in vertical alinement with the trough at the opposite end of the series of baffle plates.

The mesh disks 35 having straight upper edges 36 are carried in parallel relation by the channeled member 34 and are engaged by the corresponding trough member of the baffle plate 24 at one end of the series, thus causing these mesh disks to be in parallel relation to each other. Mesh disks 37 having cut-off upper and lower edges 38 as shown in Fig. 7 are carried upon the remaining ledges and are steadied by the corresponding overhanging troughs, as illustrated in Fig. 2. These mesh disks 37 are also spaced apart and filtering means 39 is interposed between each pair of mesh disks 35 and 37, thus forming independent members. It will be noted that these filter members extend perpendicularly, although the baffle plates slant as hereinbefore referred to. It will be noted that each filter member formed by a pair of disks and the filtering material interposed therebetween is carried by the ledge of one baffle plate and retained by the trough of an adjacent baffle plate, although as hereinbefore explained, the filter member at one end of the series of baffle plates is steadied by an independent trough 33, while the filter member at the opposite end of the series of baffle plates is supported by the channeled member 34. It should further be noted that the baffle plates are progressively carried in lower planes toward one end of the casing, whereby the air may pass around under several of the baffle plates or over several of the baffle plates, although it is necessary for the air currents to pass through at least a pair of filter members while passing through the casing.

In order to allow access to the interior of the casing, a cover plate 40 which is curved throughout its entire length is removably carried upon one side of the body 10 for covering a corresponding opening 41 in this side of the body, as illustrated in Fig. 3. The body 10 is provided with an opening 42 adjacent its upper portion in which a knob 43 of the cover plate 40 fits, while the lower portion 45 of the plate 40 extends under the edge of the opening as clearly shown in Fig. 3. When desired however, the cover plate may be swung outwardly from engagement with the body 10 and access may be had for the insertion of the baffle plates into the casing as well as the positioning of the mesh disks and the filtering material between these disks in proper positions, as hereinbefore explained.

By referring to Fig. 3 it will be noted that the edges of the baffle plates slant for facilitating the insertion of the mesh plates and filtering material into the casing and for allowing air space around which the air currents may freely pass. A discharge hopper 46 has flanged side portions 47 fixed in any desired manner upon the body 10 of the casing and this hopper 46 constitutes a closure for the lower open portion of the casing, as shown in Figs. 2 and 3. This hopper 46 has a discharge open end 48 for purposes to be hereinafter set forth. It will be noted that this discharge hopper 46 is carried directly below the independent filter members, for purposes to be hereinafter set forth.

A damper frame is used in connection with the present invention and this frame is illustrated particularly in Fig. 4. This frame has a broad body 49 from which the projection 50 extends and terminates in the rolled portion 51, it being noted that the projection 50 extends through the cap 12 and thus the rolled portion 51 constitutes pivoted supports for the damper frame. The arm 52 extends from the opposite end of the body 49 and terminates in a rearwardly curved extension 53. This extension has a portion 54 extending diagonally therefrom and terminating in a bent portion 55 having an angular retaining foot 56 thereon. A longitudinally extending rib 57 extends through the entire length of the damper frame for reinforcing the same, as shown in Figs. 2 and 4. The curved lips 58 extend from the lower end of the body 49 of the damper frame upon opposite sides of the arm 52 and these lips are intended to catch the downward rush of air entering the openings 15 and making the movement of the damper frame more certain. The wide part of the frame 49 acts as a spreader to spread or break the strong current of inrushing air, preventing it from striking more forcibly in the center of the filter than elsewhere.

The tongues 59 are bent to extend from the arm 52 adjacent the curved extension 53 and have the reduced damper 60 fixed thereon. These tongues 59 extend through a suitable opening 61 formed in the cap 12 adjacent the lower portion of the mesh disk 21 and thus the damper 60 is carried exteriorly of the casing.

An enlarged damper 62 is carried by a staple 63 upon the foot 56 and this enlarged damper is mounted upon the foot loose enough to have slight movement to allow the same to be easily seated upon the open end 48 of the discharge hopper 46 when necessary. The formation of the lower end of the damper frame is such as to allow the same to pass around easily within the casing and then extend from the discharge hopper, as shown in Figs. 1 and 2.

A priming pan 64 is carried upon the upper portion of the body 10 and has necks 65 depending therefrom and projecting through the body 10, and these necks being flanged at their inner ends, as shown in Figs. 2 and 3, thus holding the priming pan 64 against displacement. It will be noted that these necks 65 are in direct alinement with the channeled troughs 28 of the baffle plates 24 and these troughs have apertures 66 formed therethrough for purposes to be hereinafter set forth. It will also be noted that necks 65 extend through the inverted U-shaped trough members 33 for the purposes of the other necks 65.

A flat spring 67 is fixed upon the damper frame and bears upon one of the independent filter members for normally urging the damper frame in one direction, as shown in Fig. 2.

At this point, it might be stated that any number of the filter members desired may be employed without departing from the spirit of the present invention. When the engine is started the drafts of air struck through the pipe 20 into the carbureter 19 will cause the first draft through the neck 15 to swing the damper frame away from this neck and thus cause the damper 60 to be seated upon the cap 12 to close the opening 61, while the damper 62 will be seated upon the end of the discharge hopper 46 to close the opening 48 thereof. Continued suction through the casing will of course cause the suction upon these dampers to further assist in their retention upon the cap and hopper as above specified. Accordingly, as air passes down through the casing, it must first pass through the filtering material 22 and the first independent filter member. The air currents may then sweep around down under the baffle plates and then upwardly at angles through the double filter members, thus causing bits of grit, dust and other refuse in the air, as when the vehicle is passing over a dusty road to be caught by the independent filters and be prevented from passing from the casing through the necks 18 and the air pipe 20 into the carbureter.

In ordinary engines and carbureters now in use the dusty air is sucked into the carbureter and is then passed in the form of gas into the cylinders, where the grit and dust cause a great deal of trouble and unnecessary wearing and consequent injury to the engine. With the present device however, the air must necessarily pass through at least two of the independent filter members before passing to the carbureter. As the air currents pass around under certain of the baffle plates, the grit carried thereby will have a tendency to fall down into the discharge hopper or down contiguous to the opening 61 formed in the cap 12.

When the engine is stopped the spring 67 will then urge the damper frame away from the first independent filter and also the gravity of this frame will also have a tendency to swing the frame in this direction. Therefore, the dampers 60 and 62 will be removed from engagement with the cap 12 and the discharge hopper 46. As the hopper slants downwardly toward its open end, it is obvious that the grit and dust will fall from the baffle plates and the independent filter down into the hopper to slide therefrom and be discharged from the filters, while the refuse falling down to the opening 61 will fall from the cap 12. As soon as the engine is again started however, it is obvious the dampers will be returned to their seated positions and thus cause the air drawn into the carbureters to be passed through the hot air pipe leading from the manifold thus using all hot air.

The present invention is also very useful when it is desired to prime the engine to start the same during the cold weather when it is difficult to vaporize the gasolene. Under such conditions, a quantity of gasoline may be poured into the priming pan 64 and this gasolene will pass through the necks 65 and fall onto the troughs 28. As the gasolene runs along toward the ends of the troughs, it is obvious it will pass through the apertures 66 and then pass down into the filtering material 39. As the engine is started and air is drawn through the filter in the usual manner, the fumes of the gasolene will vaporize with the air and thus form a gas which is inducted into the carbureter and finally passes into the engine to provide an explosive mixture. By having the notches 23 in the disks and filtering material, 21 and 22, the damper frame may pass through this first filter member without interference.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having fully described my invention, what I claim as new and desire to secure by Letters Patent, is:—

1. In a device of the class described, the combination of a casing, slanting baffle plates carried within said casing, each baffle plate having a ledge upon its lower portion and a trough upon its upper portion, and filter means carried upon said ledges and being steadied by said troughs, whereby air currents will be directed diagonally through said filter means.

2. In a device of the class described, the combination of a casing, baffle plates carried within said casing and having ledges upon their lower portion and troughs upon their upper portions, filter members carried by said ledges and being steadied by said troughs, whereby air currents may pass through said filter members to be rid of grit and other refuse, and discharge means carried by the lower portion of the casing, to allow said grit and refuse to be discharged.

3. In a device of the class described, the combination of a casing, baffle plates carried by said casing, said baffle plates having ledges at their lower portions terminating in upstanding flanges, overhanging troughs carried at the upper portions of said baffle plates and terminating in depending flanges, filter members positioned upon said ledges, and being engaged by said troughs, each filter member consisting of a pair of spaced mesh disks having filtering means interposed therebetween, whereby air currents will be directed through said filtering members to be rid of grit and other refuse, and discharge means carried by the lower portions of said casing.

4. In a device of the class described, the combination of a casing, filtering means carried within said casing, discharge portions carried by the lower portions of said casing, a damper frame movable within said casing, and an air draft actuated damper carried by said damper frame for removably closing the lower portion of the casing.

5. In a device of the class described, the combination of a casing, filtering means carried within said casing, a damper frame hingedly mounted within said casing, said damper frame including a comparatively broad body, whereby when air currents are directed against said body, the damper frame will be swung, an arm extending beyond said body, curved and bent projections extending beyond the arm to conform in shape to the contour of the casing, dampers carried by said arm and upon the end of the damper frame, discharge portions carried by the lower portions of said casing, whereby said dampers will removably close the open lower portions of the casing.

6. In a device of the class described, the combination of a casing, filtering means carried within said casing, a discharge hopper carried by the lower portion of the casing and having a discharge opening, said casing having a discharge opening, a damper frame consisting of a body having projections thereon terminating in rolled portions said rolled portions being carried by said casing, thus pivotally supporting the damper frame, an arm extending beyond the opposite end of said body, tongues extending from said arm and having a damper thereon, said tongues extending beyond said opening and said casing, a curved extension projecting from said arm, a bent portion extending diagonally from said extension, a portion bent to extend at an oblique angle to said last mentioned bent portion and terminating in a foot, whereby said damper frame extends around into and from said discharge hopper, a damper mounted upon said foot, means for normally urging said damper frame in one direction, whereby when the damper frame is moved to the opposite direction, said dampers will engage said casing and said hopper for preventing the passage of air currents therethrough, although when said damper frame is in its normal condition, refuse may pass from said casing through said opening and hopper.

7. In a device of the class described, the combination of a casing, filtering means carried within said casing, air current actuated valve means carried by said casing, said valve means discharging refuse from the casing when air currents moving therethrough have ceased.

8. In a device of the class described, the combination of a casing, slanting baffle plates carried within said casing, each baffle plate having a ledge upon its lower portion and an apertured trough upon its upper portion, means for supplying liquid to each trough, filtering means carried upon said ledge portion and being steadied by said trough whereby air currents may be directed diagonally through said filter means, and air current actuated valve means carried by said casing, said valve means discharging refuse from the casing when air currents moving therethrough have ceased.

9. In a device of the class described, the combination of a casing, baffle plates carried by said casing, said baffle plates having ledges at their lower portions terminating in upstanding flanges, overhanging apertured troughs carried at the upper portions of said baffle plates and terminating in depending flanges, means for supplying liquid to said troughs, filter members positioned upon said ledges and being engaged by said troughs, each filter member consisting of a pair of spaced mesh disks having filtering means interposed therebetween, whereby air currents will be directed through said filtering means to be rid of dust or other refuse.

10. In a device of the class described, the combination of a casing, baffle plates carried within said casing and having ledges upon their lower portions and troughs upon their upper portions, filter members carried by said ledges and being steadied by said troughs, whereby air currents may pass through said filter members to be rid of dust and other refuse, discharge portions carried by the lower portions of said casing, a damper frame movable within said casing, and an air draft actuated damper carried by said damper frame for removably closing the discharge portion.

11. In a device of the class described, the combination of a casing, baffle plates carried by said casing, said baffle plates having ledges at their lower portions terminating in upstanding flanges, overhanging apertured troughs carried at the upper portions of said baffle plates and terminating in depending flanges, means for supplying liquid to said troughs, filtering members positioned upon said ledges and being engaged by said troughs, each filtering member consisting of a pair of spaced mesh disks having filtering means interposed therebetween, a discharge portion carried by the lower portion of said casing, a damper frame movable within said casing, and an air draft actuated damper carried by said damper frame for removably closing said discharge portion.

12. In a device of the class described, the combination of a casing, filtering means carried within said casing, a discharge hopper carried by the lower portion of the casing and having a discharge opening, a damper frame pivotally supported within said casing, said frame including a body having an arm extending therebeyond, a curved extension projecting from said arm, a bent portion extending from said extension, a portion bent to extend at an oblique angle to the last mentioned bent portion and terminating in a foot, whereby said damper frame extends around and into and from said discharge hopper, a damper mounted upon said foot, means for normally forcing said damper in one direction, whereby when the frame is moved in the opposite direction said damper will engage said hopper for causing said discharge opening, although when said damper frame is in normal position refuse may pass through said discharge opening.

13. In a device of the class described, the combination of a casing, filtering means carried within said casing, a discharge hopper carried by the lower portion of the casing, and having a discharge opening, said casing having a discharge opening, a damper frame consisting of a body which is hingedly mounted within said casing, an arm extending beyond one end of said body, tongues extending from said arm and having a damper thereon, said tongues extending through the opening in said casing, said damper frame being extended beyond said arm in a manner to conform to the contour of said casing and hopper, a damper mounted upon the extreme end of said frame, means for allowing refuse to pass from said casing and hopper, although when such damper frame is moved in the opposite direction, said openings will be closed.

In testimony whereof I affix my signature in presence of two witnesses.

AUSTIN O. CRAVEN.

Witnesses:
G. M. OAKES,
H. A. GILMARTIN.